(12) United States Patent
Reeder et al.

(10) Patent No.: US 10,957,288 B2
(45) Date of Patent: Mar. 23, 2021

(54) INSTRUMENT STAND

(71) Applicant: ROVNER PRODUCTS INCORPORATED, Timonium, MD (US)

(72) Inventors: George Reeder, Reisterstown, MD (US); Lynn Reeder, Reisterstown, MD (US)

(73) Assignee: ROVNER PRODUCTS INCORPORATED, Timonium, MD (US)

( * ) Notice: Subject to any disclaimer, the term of this patent is extended or adjusted under 35 U.S.C. 154(b) by 0 days.

(21) Appl. No.: 16/255,285

(22) Filed: Jan. 23, 2019

(65) Prior Publication Data

US 2020/0234680 A1    Jul. 23, 2020

(51) Int. Cl.
  *C10G 5/00* (2006.01)
  *G10G 5/00* (2006.01)
  *F16M 11/20* (2006.01)

(52) U.S. Cl.
  CPC ............... *G10G 5/00* (2013.01); *F16M 11/20* (2013.01)

(58) Field of Classification Search
  CPC .................................. G10G 5/00; F16M 11/20
  See application file for complete search history.

(56) References Cited

U.S. PATENT DOCUMENTS

| | | | | |
|---|---|---|---|---|
| 6,281,417 B1 * | 8/2001 | Ladao | ................... | A47F 7/0035 211/85.6 |
| 7,017,870 B2 * | 3/2006 | Meyer | ................... | H04R 1/083 156/91 |
| 7,176,366 B1 * | 2/2007 | Bruce | ................... | A47B 81/00 84/327 |
| 2004/0144233 A1 * | 7/2004 | Hsieh | ...................... | G10G 5/00 84/327 |
| 2014/0151527 A1 * | 6/2014 | Sawhney | ............. | F16M 11/242 248/542 |

* cited by examiner

*Primary Examiner* — Kimberly R Lockett
(74) *Attorney, Agent, or Firm* — Patent Portfolio Builders PLLC

(57) ABSTRACT

An adjustable, collapsible and extensible instrument stand includes a base, at least one riser releasably attached to the base and extending upward from the base and a grasper attached to the riser to fasten a musical instrument to the instrument stand. The grasper is moveable along the riser to change a distance between the grasper and the base.

20 Claims, 12 Drawing Sheets

INSTRUMENT STAND

TECHNICAL FIELD

Embodiments of the subject matter disclosed herein relate to stands for musical instruments.

BACKGROUND

Musical instruments, including brass instruments, woodwind instruments and string instruments, are held during use and may also be supported by resting the instrument against parts of the body or attaching the instrument to straps and lanyards. When not being played, the musical instruments are placed in cases or on stands. Stands are also used to display the instruments. The musical instrument rests in the stand and is simply lifted from the stand. This lack of connection between the stand and the instrument, however, can result in the instrument falling out of the stand or being quickly removed from the stand by someone not authorized to touch or play the instrument.

In addition to concerns over the stability and security of conventional stands, a given stand holds a single instrument. Conventional stands are specific to the type, style, shape, size and weight of the single instrument being held by the stand. A large variable in shape, size and weight exists among musical instruments, even for a given type of musical instrument. For example, the available types of saxophones include sopranino saxophone, soprano saxophone, alto saxophone, tenor saxophone, baritone saxophone, bass saxophone, contrabass saxophone and subcontrabass saxophone. While these instruments have a common type, i.e., saxophone, the shape, size and weight of the various saxophones vary. For a person playing different saxophones or a manufacturer displaying different saxophones, different stands are required for the various saxophones. Additional stands are also be required for instruments that, while similar to saxophones, e.g., oboe, clarinet, E-flat clarinet, bass clarinet, bassoon and contrabassoon, have shapes, sizes and weights that necessitate different stands.

Therefore, a need exists for an instrument stand that can accommodate a variety of types, styles, shapes, sizes and weights of musical instruments, that can hold multiple instruments at the same time and that secure the musical instrument in the stand.

SUMMARY

Exemplary embodiments are directed to an instrument stand that holds an instrument for either storage or display. The instrument stand can hold brass instruments and woodwind instruments. Woodwind instruments that can be held by the instrument stand include, but are not limited to, a sopranino saxophone, a soprano saxophone, an alto saxophone, a tenor saxophone, a baritone saxophone, a bass saxophone, a contrabass saxophone, a subcontrabass saxophone, an oboe, a clarinet, an E-flat clarinet, a bass clarinet, a bassoon and a contrabassoon. The same instrument stand can accommodate all these different types and styles of instruments. To accommodate a variety of types, styles and sizes of musical instruments, the instrument stand is adjustable. Preferably, the instrument stand is adjustable without tools.

A given instrument is held securely and fixedly in the instrument stand until released. In one embodiment, the instrument stand attaches to or grasps existing frame or body portions of the musical instrument. For example, the instrument stand attaches to the neck strap ring that is welded to the body of a musical instrument such as a saxophone or attached to a clarinet. The neck strap ring is configured for attachment of a neck strap or lanyard worn by the person playing the musical instrument. Alternatively, the instrument stand attaches to finger hooks or braces attached to the body of the musical instrument. While the instrument stand supports an entire weight of the musical instrument at the point at which the musical stand attaches to the musical instrument, e.g., the neck strap ring, the instrument stand also includes a base on which a portion of the musical instrument can rest. In one embodiment, the base includes a base pad to contact the musical instrument.

In addition to being adjustable, the instrument stand is collapsible. The collapsible instrument stand is assembled for use in holding and displaying a musical instrument and disassembled for storage or shipping of the instrument stand. The instrument stand is easily assembled and disassembled. Preferably, the instrument stand is assembled and disassembled without tools.

Exemplary embodiments are directed to an instrument stand comprising. The instrument stand includes a base. In one embodiment, the base fits within a rectangular area having an overall depth of less than about 12 inches and an overall width of less than about 22 inches. In one embodiment, the base is a partial circular sector with a central angle of 120 degrees. The partial circular sector includes an inner arc at a radius of five inches and an outer arc at a radius of fifteen inches.

The instrument stand includes at least one riser releasably attached to the base and extending upward from the base and at least one grasper attached to the riser to fasten a musical instrument to the instrument stand. The grasper is moveable along the riser to change a distance between the grasper and the base. In one embodiment, the grasper is configured to grasp a neck strap ring on the musical instrument to fasten the musical instrument to the instrument stand. In one embodiment, the grasper includes an arm extending from the riser. The arm has a proximal end adjacent the riser, a distal end opposite the proximal end, a slot extending in from the proximal end and having a gap width and a hole extending through a portion of the arm containing the slot. A pin is moveably disposed in the hole and spans the gap width of the slot. A biasing member is disposed between the pin and the arm to bias the pin in the hole and across the gap width.

In one embodiment, the riser is cylindrical, and the grasper includes a slip ring. The cylindrical riser extends through the slip ring, and the arm extends radially out from the slip ring. In one embodiment, the riser has a notch extending into the riser along a length of the riser, and the grasper includes a threaded bore passing radially through the slip ring opposite the arm and a threaded fastener extending through the threaded bore and engaging the notch. In one embodiment, the riser has a central bore, and the base includes a locating pin extending from the base. The locating pin engages the central bore when the riser is attached to the base. In one embodiment, the instrument stand includes a detent pin extending through the riser and the locating pin to secure the riser to the base.

In one embodiment, the instrument stand includes a plurality of risers and a plurality of graspers. Each riser attached to a distinct location on the base, and each grasper is attached to one of the risers. In one embodiment, the instrument stand has three risers and three graspers. In one embodiment, the risers are located at a plurality of distinct locations along and adjacent the inner arc of the base.

Exemplary embodiments are also directed to an instrument stand containing a base, a single riser releasably attached to the base and a plurality of separate and distinct graspers. The riser extends upward from the base and contains a notch extending into the riser along a length of the riser. Each grasper is attached to the riser, moveable along the riser to change a distance between the grasper and the base and configured to grasp a neck strap ring on a musical instrument to fasten the musical instrument to the instrument stand. Each grasper includes a slip ring, a pair of threaded bores passing radially through the slip ring and a single threaded fastener extending through one threaded bore in the pair of threaded bores and engaging the notch. The riser extends through the slip ring, and the pair of threaded bores are spaced from each other around the slip ring a positioning angle.

Exemplary embodiments are directed to an instrument stand system containing a plurality of separate instrument stands. Each instrument stand includes a base that is a partial circular sector, a plurality of risers releasably attached to the base and extending upward from the base and a plurality of graspers. Each grasper is attached to one of the plurality of risers to fasten a musical instrument to the instrument stand, and the grasper is moveable along the riser to change a distance between the grasper and the base. In one embodiment, the instrument stand system contains three instrument stands, and the partial circular section of each base has a central angle of 120 degrees, an inner arc at a radius of five inches and an outer arc at a radius of fifteen inches. The bases of the three instrument stands fit together to form a circle having a diameter of about 30 inches.

In one embodiment, each instrument stand includes three risers releasably attached to the base at a plurality of distinct locations along and adjacent the inner arc. In one embodiment, each grasper is configured to grasp a neck strap ring on a musical instrument to fasten the musical instrument to the instrument stand. In one embodiment, each riser is cylindrical. Each grasper includes a slip ring, and one of the cylindrical risers extends through the slop ring. Each grasper also includes an arm extending radially out from the slip ring. The arm includes a proximal end adjacent the riser, a distal end opposite the proximal end, a slot extending in from the proximal end and having a gap width, and a hole extending through a portion of the arm containing the slot. A pin is moveably disposed in the hole and spans the gap width of the slot, and a biasing member is disposed between the pin and the arm to bias the pin in the hole and across the gap width.

In one embodiment, each riser includes a notch extending into the riser along a length of the riser. Each grasper also includes a threaded bore passing radially through the slip ring opposite the arm and a threaded fastener extending through the threaded bore and engaging the notch.

BRIEF DESCRIPTION OF THE DRAWINGS

The accompanying drawings, which are incorporated in and constitute a part of the specification, illustrate a plurality of embodiments and, together with the following descriptions, explain these embodiments.

DETAILED DESCRIPTION

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Figure 1:
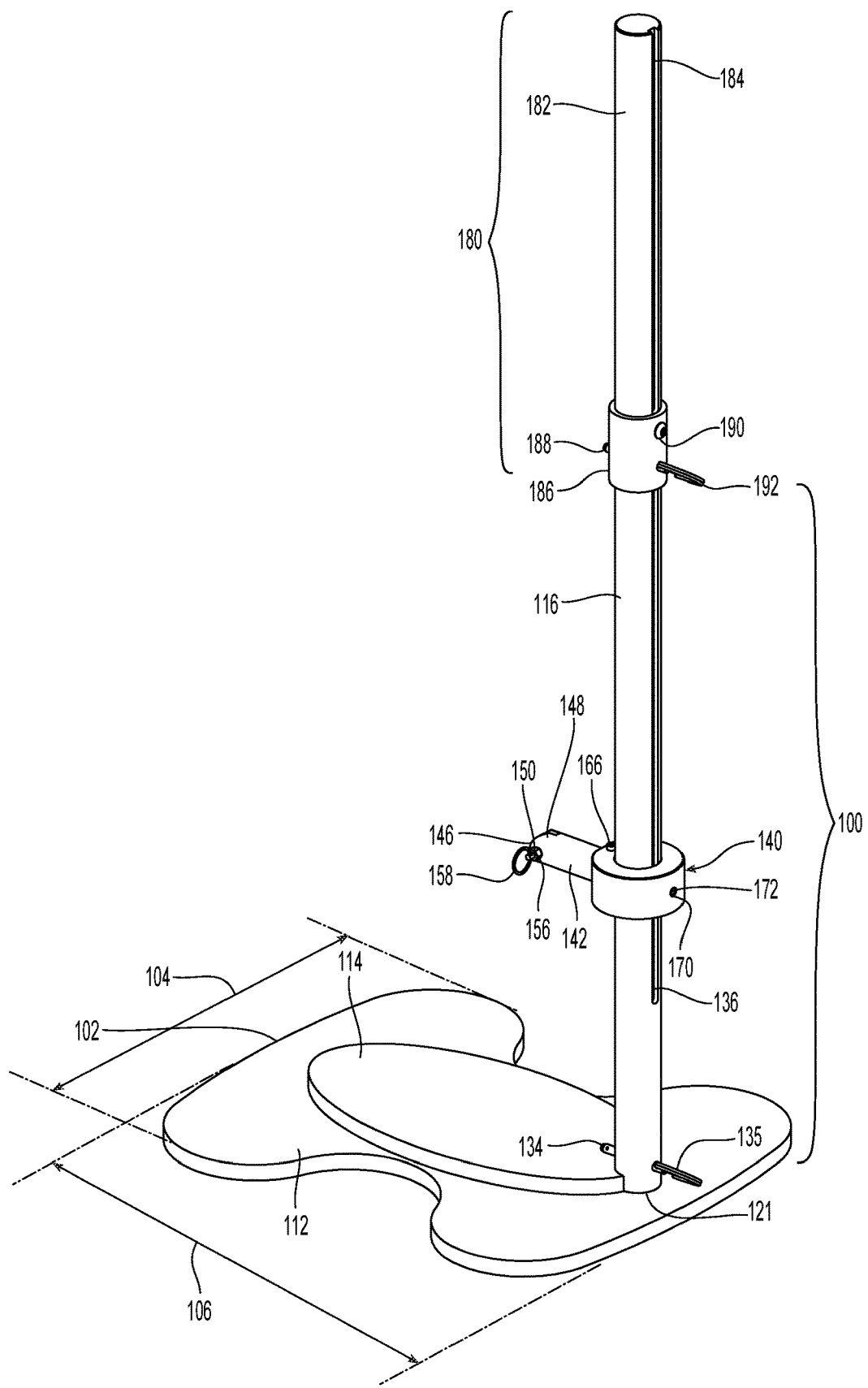
FIG. 1 is a perspective view from the back of an embodiment of an instrument stand and riser extension.
Figure 2:
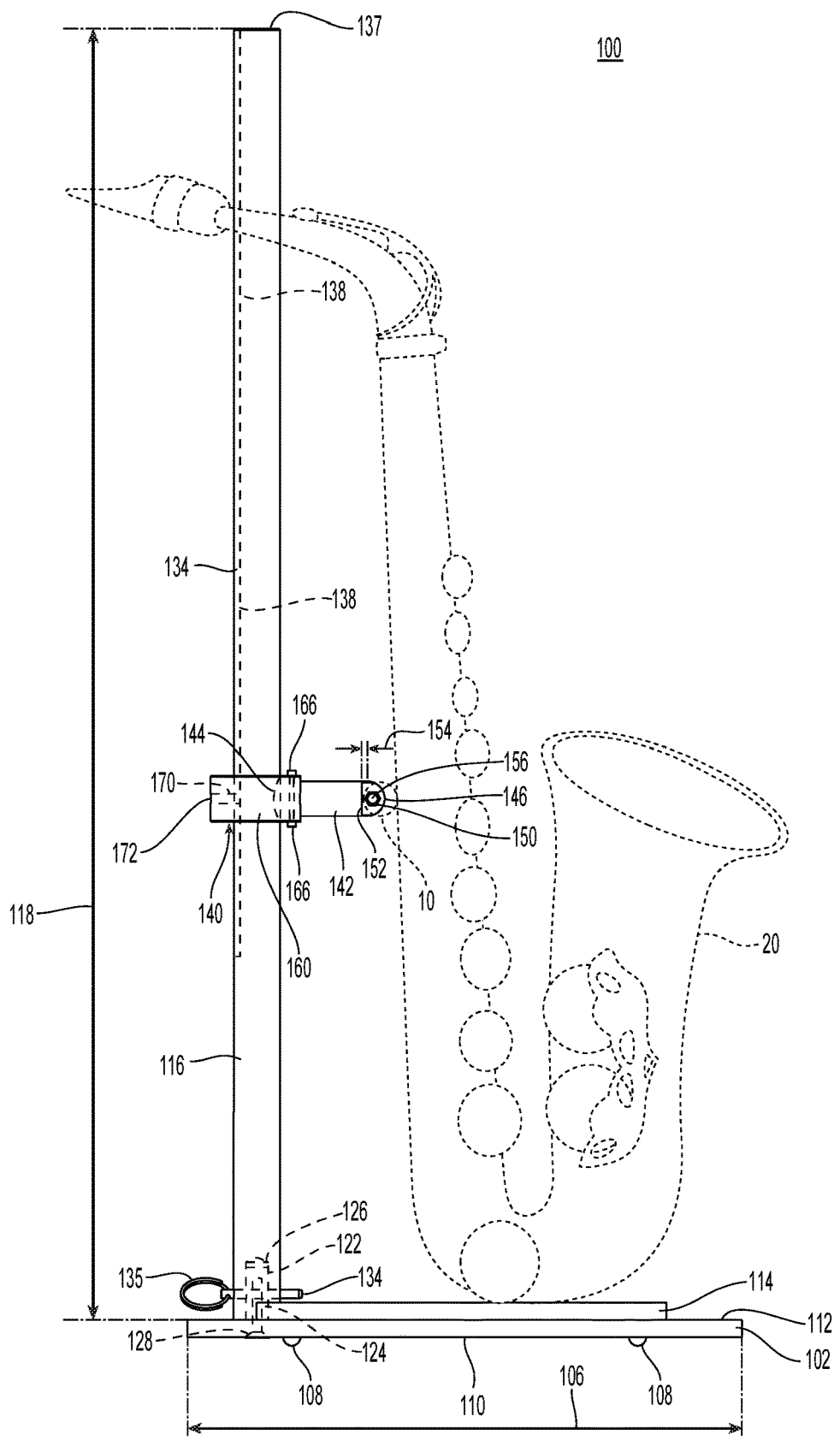
FIG. 2 is a side view of the instrument stand.
Figure 3:
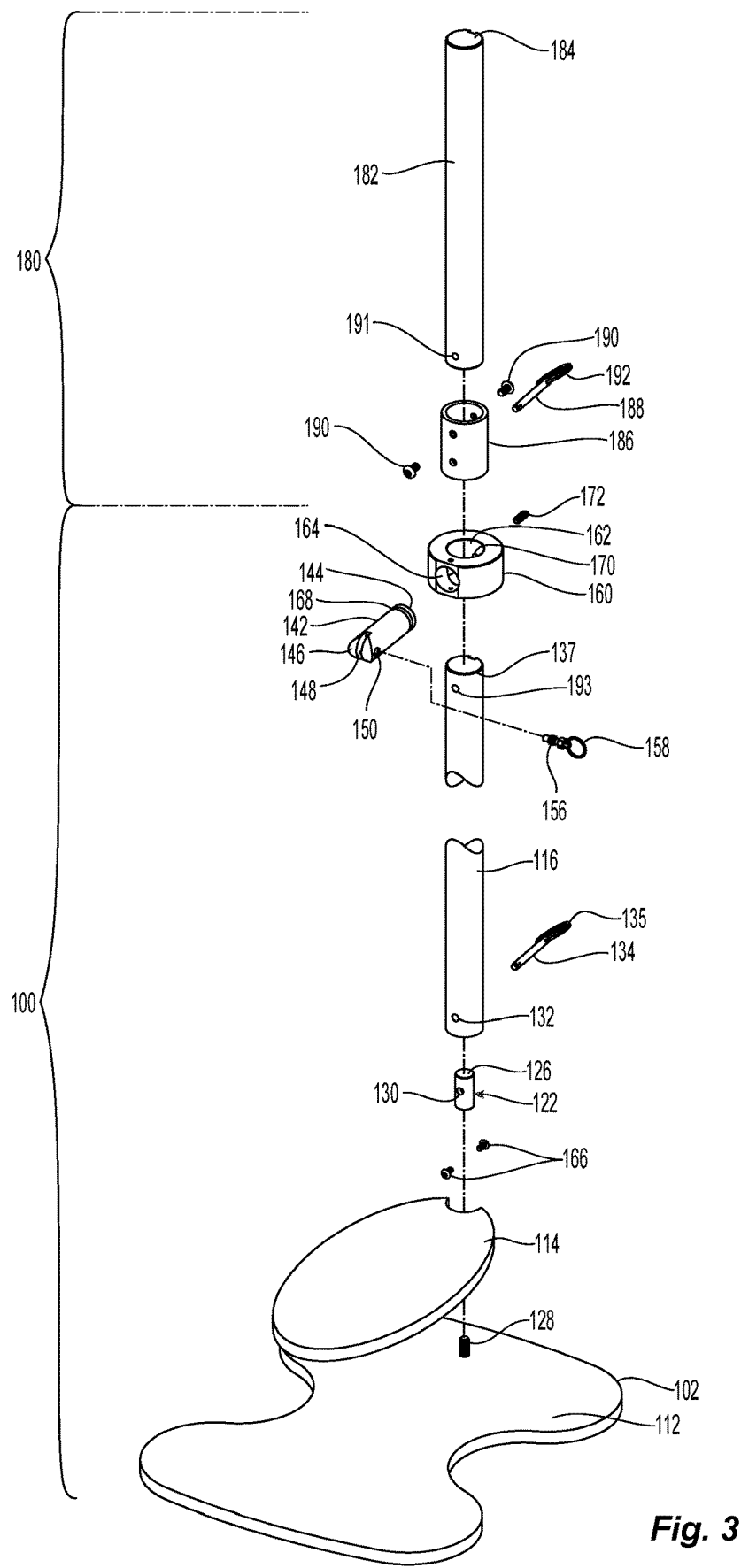
FIG. 3 is an exploded perspective view of the embodiment of the instrument stand and riser extension.
Figure 4:
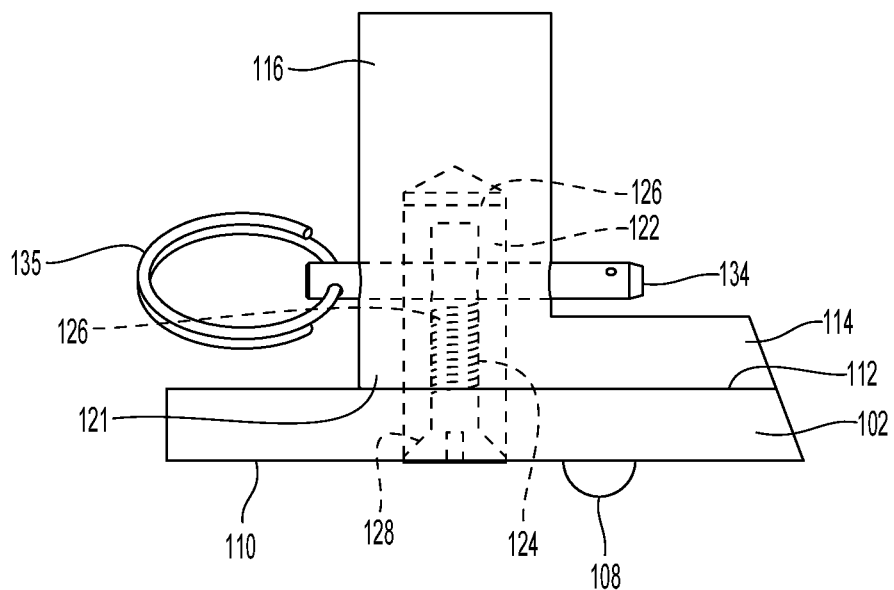
FIG. 4 is a side hidden line view of a section of the instrument stand showing the riser attached to the base.
Figure 5:
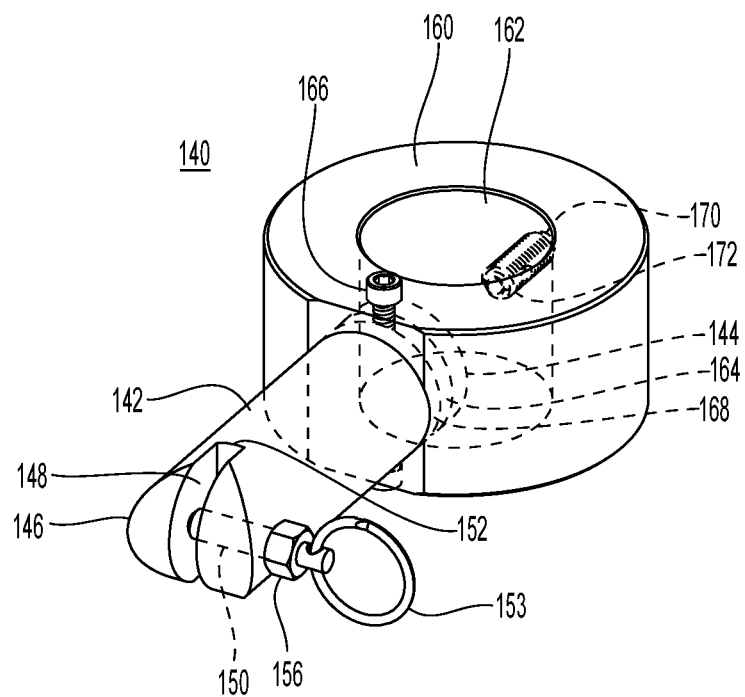
FIG. 5 is a perspective hidden line view of an embodiment of a grasper.

Referring initially to FIGS. 1-3, exemplary embodiments are directed to an instrument stand 100. The instrument stand can be assembled for use in holding or displaying a musical instrument and disassembled for storage or shipping. In addition, the instrument stand is adjustable to accommodate a variety or styles, types and sizes of musical instruments. The musical instrument stand includes a base 102. Suitable materials for the based include metals, woods, plastics, polymers, elastomers and combinations thereof. These materials can be opaque, translucent or transparent. In one embodiment, the materials are colored. In one embodiment, the base is constructed from a transparent polymer, for example, transparent acrylic. Preferably, the polymer is transparent polycarbonate. The base has a size and weight to support the weight of the musical instrument attached to the instrument stand and to prevent tipping of the musical instrument stand. Preferably, the size of the base is selected to fit on conventional shelves and counters. Therefore, in one embodiment, the base fits within a rectangular area having an overall depth 106 of less than about 12 inches, i.e., the depth of a conventional shelf, and an overall width 104 of about 10". In another embodiment, the base fits within a rectangle having an overall depth of less than about 12 inches and an overall width of less than about 22 inches. In another embodiment, the base fits within a rectangle having an overall depth of less than about 9 inches and an overall width of less than about 17 inches, e.g., about 16.39 inches. The base can have any desired shape. As illustrated, the base has an hour glass shape.

In one embodiment, a plurality of rubber feet 108 are attached to the bottom surface 110 of the base. In one embodiment, the instrument stand includes four rubber feet. The rubber feet provide slip resistance to the instrument stand. In one embodiment, the rubber feet are clear. The base includes a top surface 112 opposite the bottom surface. In one embodiment, the instrument stand includes a base pad 114 attached to and covering at least a portion of the top surface of the base. Suitable materials for the base pad include foam rubber and textiles such as vinyl. Preferably, the base pad is polyurethane foam. In general, the base pad provides a cushion surface to support the musical instrument.

The instrument stand includes at least one riser 116 or vertical member attached to the top surface of the base and extending vertically upward from the base. The riser extends upward from the base a distance or height 118 sufficient to accommodate the largest or tallest musical instrument to be held by the instrument stand. Suitable materials for the riser include metals, wood, plastics, polymers, elastomers and combinations thereof. These materials can be opaque, translucent or transparent. In one embodiment, the materials are colored. In one embodiment, the riser is constructed from a transparent polymer, for example, transparent acrylic. Preferably, the polymer is transparent polycarbonate. Suitable cross sections for the riser include rectangular, triangular, oblong and circular; however, other cross-sectional geometries can be used. Preferably, the riser has a circular cross section.

The riser contains a notch 136 extending into the riser from the outer surface of the riser and along a length of the riser from a top end 137 of the riser. In one embodiment, the notch extends into the riser from the outer surface a depth of about 0.22 inches. The length that the notch extends along the riser is less than the overall length or height of the riser. Therefore, the riser is spaced from the bottom end 121 of the riser. In one embodiment, the notch has a rectangular cross-section. In one embodiment, the interior face 138 of the notch is a flat surface. Alternatively, the interior face of the notch includes holes, bumps or other recesses.

In one embodiment, the riser is releasably attached to the base. For example, the riser can be attached to a threaded hole extending into the base. Preferably, the riser is attached to the base such that the riser can be easily detached from the base without tools and with minimum manipulation of movement of the riser such as rotating the riser to thread the riser into a hole. In one embodiment, the riser includes a central bore 120, for example, a cylindrical central bore, extending into the bottom end 121 of the riser that contacts the top surface of the base. In one embodiment, the cylindrical central bore has a diameter of about 0.5 inches.

Referring to FIGS. 1-4, the instrument stand includes a locating pin 122 attached to the base and extending up from the top surface of the base. In one embodiment, the locating pin is cylindrical and is sized to accommodate the central bore of the riser, i.e., to achieve a snug fit between the locating pin and the central bore. Preferably, the location pin is a stainless steel dowel. The locating pin engages the central bore when the riser is attached to the base, and the central bore extends into the riser a distance sufficient to accommodate the locating pin. The locating pin includes a flat top surface 126 that passes into the central bore and a threaded passage 124 extending into the locating pin opposite the flat top surface. A threaded fastener 128 passes through the base and threads into the locating pin to secure the locating pin to the base. In one embodiment, the fastener is a flat head screw. The bottom or head of the screw that touches the base is flat or extra wide to create the effect of a washer. Other suitable shapes for the bottom or head of the fastener include button, pan, round, round washer and truss. The locating pin is secured to the base using the threaded fastener, becoming part of the base.

The instrument stand includes a detent pin 134 extending through a base attachment hole 132 that passes through the riser adjacent the end of the riser in contact with the base. The detent pin also passes a through hole 130 in the locating pin that is aligned with the base attachment hole. Suitable detent pins are known and available in the art. A ring 135 or other suitable handle is attached to one end of the detent pin to facilitate insertion and removal of the detent pin. The ring also prevents the detent pin from passing completely through the base attachment hole and through hole. Therefore, the detent pin secures the riser to the base. Alignment between the base attachment hole and the through hole provides proper orientation between the riser and the base. The detent pin is easily inserted into and removed from the aligned holes. With the detent pin removed, the riser can be separated from the base, facilitating disassembly of the instrument stand.

Referring now to FIGS. 1-3 and 5, the instrument stand includes a grasper 140 attached to the riser. The grasper is configured to fasten a musical instrument to the instrument stand. The grasper secures or locks the musical instrument into the musical instrument stand. The grasper is moveable along the riser to change a distance between the grasper and the base or the base pad. The grasper can be secured to or can hold any suitable portion of the body or structure of the musical instrument, for example, finger hooks and brackets. In one embodiment, the grasper is configured to grasp a neck strap ring 10 on the musical instrument 20 to fasten the musical instrument to the instrument stand.

In one embodiment, the grasper includes an arm 142 extending from the riser. The arm is attached to or mounted to the riser to provide relative movement between the arm and the riser. In one embodiment, the arm is slidable along the length of the riser. The arm includes a proximal end 144 adjacent the riser, and a distal end 146 opposite the proximal end. The proximal end and distal end define a span length of the arm. In one embodiment, the proximal end includes a curvature matching the curvature of the outer surface of the riser. Therefore, the arm has a form fitting engagement with the riser. Alternatively, the proximal end is flat and spaced from the outer surface of the riser. In one embodiment, the arm is a cylindrical member having a circular cross-section; however, other shapes and geometries can be used for the arm. A slot 148 in the arm extends in from the proximal end. For an arm having a circular cross section, the slot extends across a diameter of the cross section of the arm. In one embodiment, the slot is oriented vertically, i.e., parallel to the length of the riser. In one embodiment, the arm is rotatable about an axis passing through the center of the arm and perpendicular to the length of the riser. Rotation of the arm about the axis positions the slot in a desired position from a horizontal orientation to a vertical orientation. The slot extends into the arm a slot depth. In addition, the slot has a gap width. The gap width is sufficient to allow passage into the slot of the portion of the musical instrument held by the grasper. For example, the gap width is sufficient to allow a neck strap ring to pass into the slot.

A hole 150 extends through a portion of the arm containing the slot. The hole is adjacent the proximal end. The hole extends completely through the arm. For an arm having a circular cross section, the hole extends along a diameter of the circular cross section. Preferably, the diameter along which the slot extends is perpendicular to the diameter along which the hole extends. The hole is located a distance 154 from a bottom 152 of the slot. This distance is sufficient to allow the portion of the musical instrument held by the grasper, e.g., the next strap ring, to be entirely positioned between the hole and the slot bottom.

A pin 156 is disposed in the hole and has a length sufficient to span the gap width of the slot. The pin is moveable within the hole between a position in which the pin is spanning the slot and a position in which the pin does not extend into the slot. When the pin spans the slot, the slot is closed, and the portion of the musical instrument placed into the slot is secured to the arm and the musical stand. When the pin does not extend into the slot, the slot is open, and the portion of the musical instrument to be held by the musical instrument stand can be moved into and out of the slot. Preferably, the pin is biased into the position in which the pin is spanning the slot, i.e., in which the slot is closed. Therefore, the grasper will hold the portion of the musical instrument until the pin is moved to release that portion. In one embodiment, a biasing member, for example a spring, is disposed between the pin and the arm to bias the pin in the hole and across the gap width. Suitable arrangements of pins and biasing members include spring plungers. The pin and biasing members are attached to the arm and held in the hole using fasteners. In one embodiment, a ring 158 is attached to an end of the pin. The ring can be grabbed and pulled to move the pin toward the position in which the pin does not extend into the slot.

In one embodiment, the grasper includes a slip ring 160. The slip ring connects the arm to the riser and provides relative movement between the arm and the riser. In one embodiment, the slip ring also provides for rotational movement of the arm and, therefore, orientation of the slot. In one embodiment, the slip ring is cylindrical with a circular cross section and a cylindrical central passage 162. The cylindrical riser extends through the cylindrical central passage of the slip ring. The slip ring includes a circular passage 164 extending radially through the slip ring and into the central passage. The arm extends through the circular passage and radially out from the slip ring. A pair of set screws 166 run axially along the slip ring and into the top and bottom of the circular passage. These set screws engage an annular groove 168 extending around the arm adjacent the distal end. Engagement of the set screws in the annular groove secure the arm to the slip ring. The arrangement of the annular groove and set screws also facilitates rotation of the arm within the circular passage. In one embodiment the set screws provide for the securing and rotation of the arm. In one embodiment, each set screw bottoms but still allows the arm able to rotate. The use of two opposing screws provides added security. Therefore, if one set screw loosens or falls out, the remaining set screw continues to secure the arm.

The grasper includes a threaded bore 170 passing radially through the slip ring opposite the circular passage and the arm. A threaded fastener 172 is threaded into the threaded bore and extends through the threaded bore to engage the notch. Engagement of the threaded fastener in the notch establishes an orientation of the slip ring and arm around the riser. Contact and friction between the threaded fastener and the interior face of the notch holds the slip ring and arm at a desired location along the length of the riser and above the base and base pad. In one embodiment, movement of the threaded fastener releases the fastener from the interior face and provides for upward or downward movement of the slip ring and arm. Preferably, the threaded fastener is a spring plunger having a threaded outer housing that engages the threaded bore to prevent relative movement between the outer housing and the threaded bore. The spring plunger includes a spring-loaded ball or pin in contact with the interior face of the notch and asserting from about 2 pounds to about 5 pounds of force on the interior face. This force is sufficient to hold the grasper at a given position along the length of the riser. Applying force to either the top of bottom of the slip ring provides adjustment of the location of the grasper along the height of the riser without having to move or to disengage the spring plunger from the interior face of the notch. Suitable materials for the slip ring and arm include metals, woods, plastics, polymers, elastomers and combinations thereof. These materials can be opaque, translucent or transparent. In one embodiment, the materials are colored. In one embodiment, the slip ring is constructed from a transparent polymer, for example, transparent acrylic. Preferably, the polymer is transparent polycarbonate.

Figure 6:
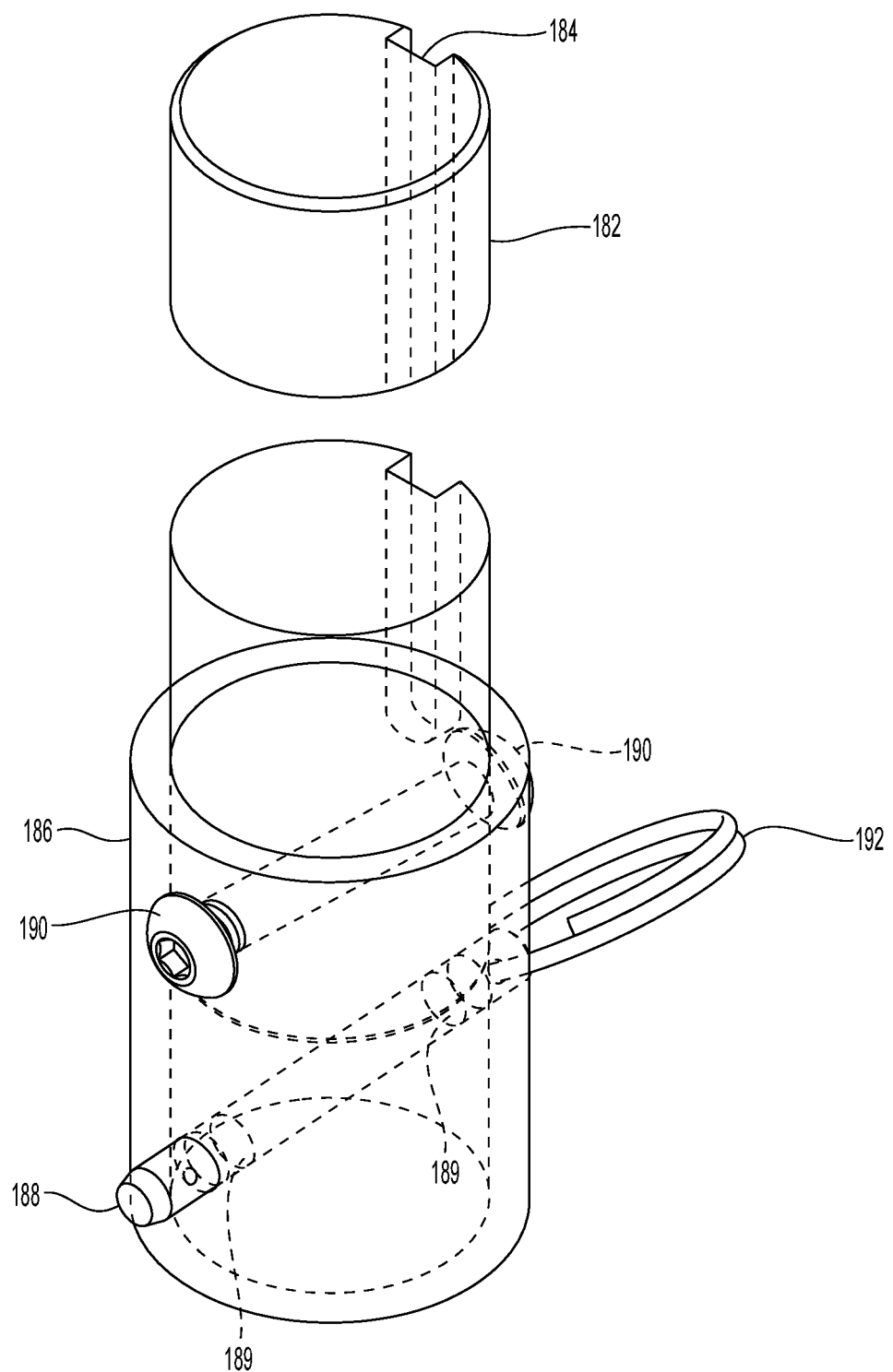
FIG. 6 is a perspective hidden line view of an embodiment of a riser extension.

In addition to being adjustable and collapsible, i.e., easily assembled and disassembled, in one embodiment, the instrument stand is extensible. Referring now to FIGS. 1, 3 and 6, in one embodiment, the instrument stand is available with a riser extension 180. The riser extension attaches to the top end 137 of the riser. The riser extension includes a length of additional riser 182. The additional riser is constructed of the same materials as the riser and has the same shape as the riser. The additional riser includes a notch extension 184 having the same shape and dimensions as the notch in the riser. Therefore, the grasper can be attached to and moveable along the additional riser to accommodate larger or taller musical instruments. In one embodiment, separate graspers can be attached to the riser and to the additional riser. The riser extension 180 includes an attachment collar 186. The additional riser is inserted into the attachment collar and is fixedly secured to the attachment collar by a pair of radially opposed sets screws passing through the attachment collar and into the additional riser. The attachment collar also includes two additional diametrically opposed radial holes 189. The riser includes an extension attachment hole 193 passing through the riser adjacent the top end. The riser is inserted into the attachment collar, and the diametrically opposed radial holes are aligned with the extension attachment hole. An extension fastener 188 is inserted through the holes. Suitable extension fasteners include, but are not limited to, a detent pin. A grasp ring 192 is attached to the extension fastener to provide for insertion and removal of the detent pin. Therefore, the riser extension is removably attachable to the riser and can be easily attached and removed by hand without tools.

While illustrated with a single grasper, in other embodiments, two or more graspers can be moveably attached to a single riser. In one embodiment, a single slip ring can include two or more arms. In one embodiment, the instrument stand can include a single base and a plurality of risers attached to the single base. In addition, a plurality of instrument stands can be arranged into an instrument stand assembly. Multiple risers on a single stand and multiple stands in an instrument stand assembly accommodate holding and displaying multiple instruments including instruments that vary in type, style and size.

Figure 7:
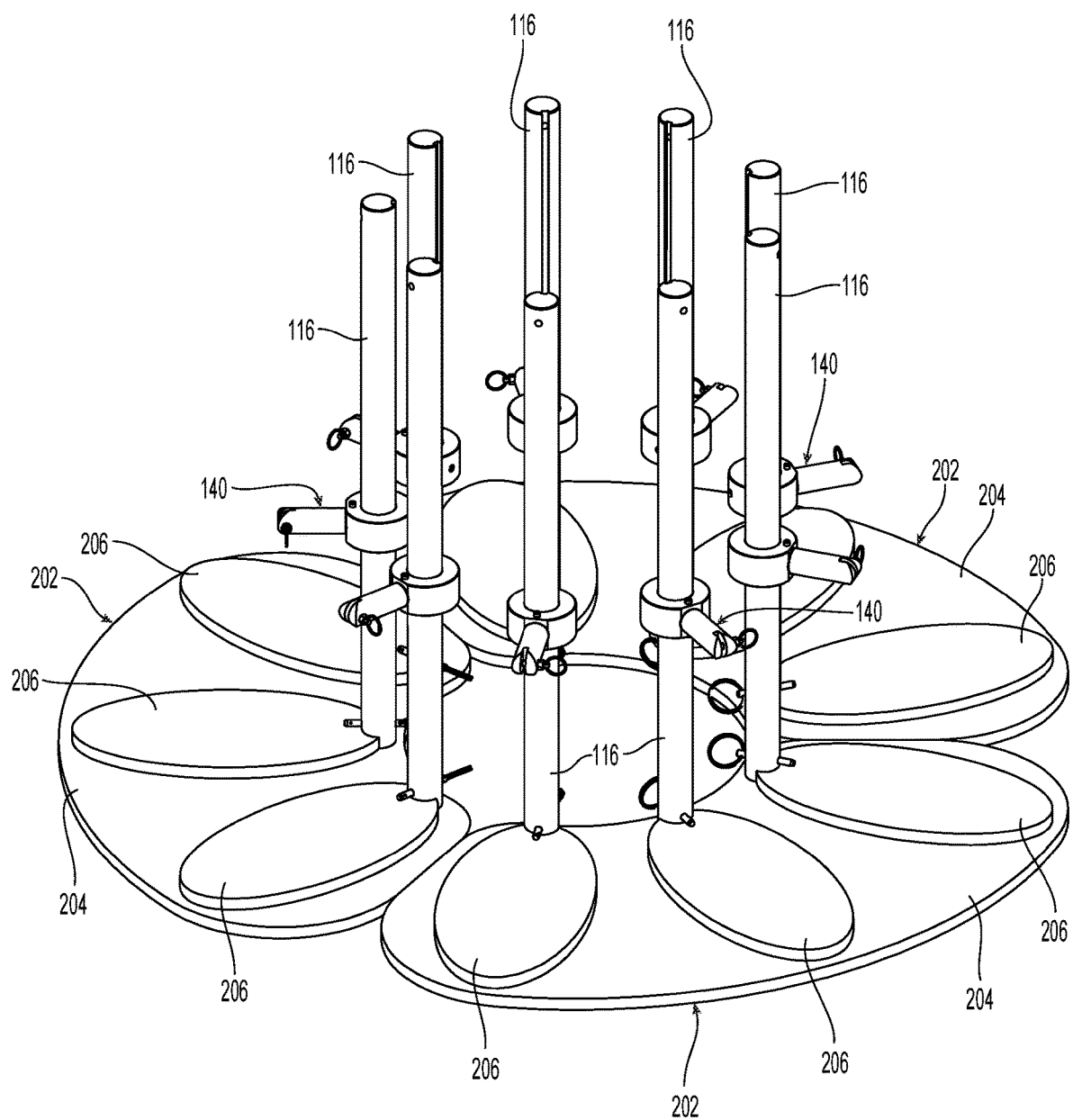
FIG. 7 is a perspective view of an embodiment of an instrument stand system.
Figure 8:
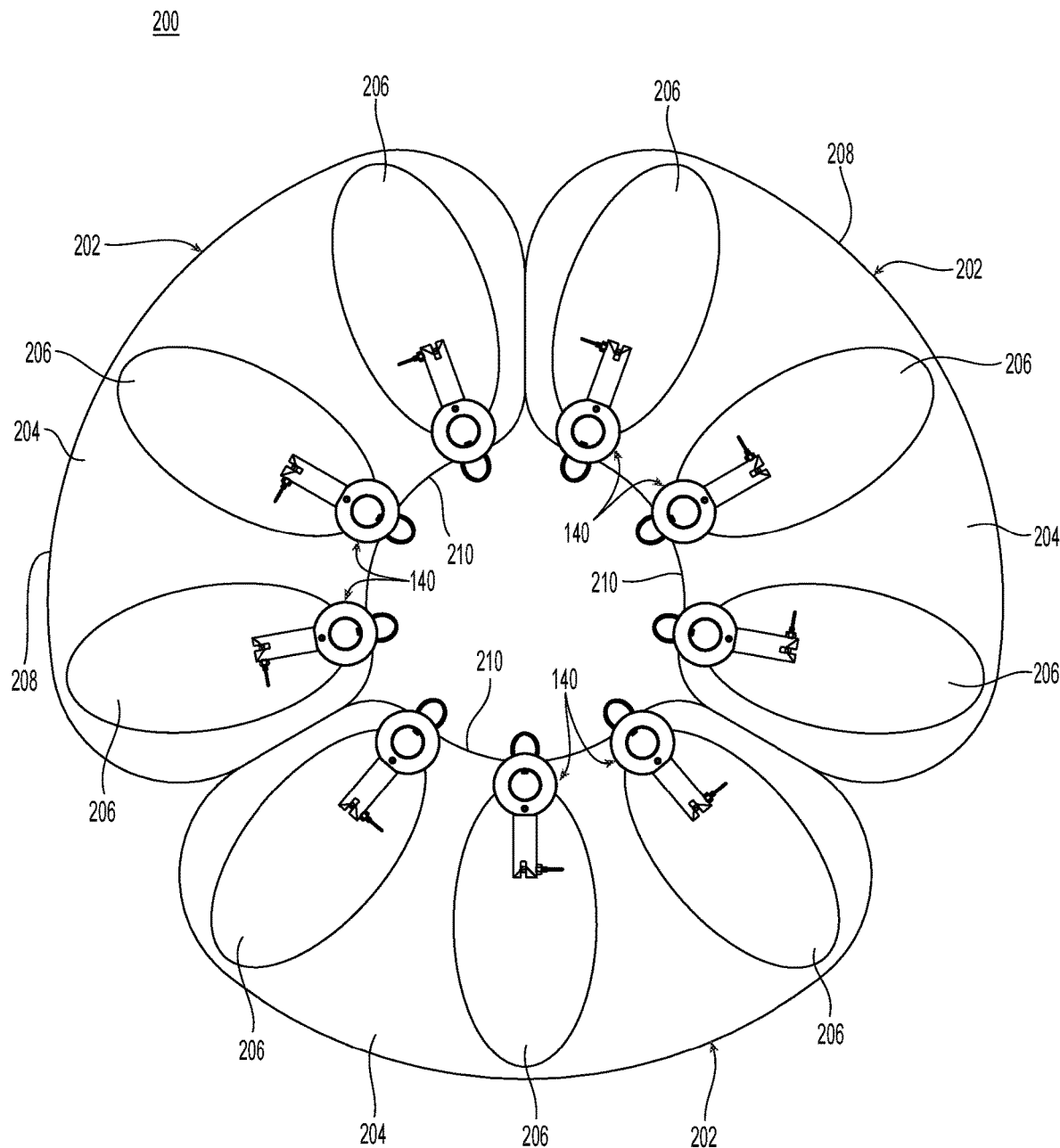
FIG. 8 is a top view of the instrument stand system.

Referring to FIGS. 7 and 8, exemplary embodiments are directed to an instrument stand system 200 containing a plurality of separate instrument stands 202. Each instrument stand includes a base 208 and a plurality of risers 116. Each riser is attached to a distinct location on the base. Each instrument stand also includes a plurality of separate and independent base pads 206, one for each riser. The base pads are attached to a top surface 204 of the base. The instrument stand also includes a plurality of graspers 140. Each grasper is attached to one of the risers. In one embodiment, each instrument stand includes three risers and three graspers. Suitable arrangements of risers and graspers for use with the instrument stand system are discussed herein. Suitable materials for the components of the instruments stands in the instrument stand system are the same as the materials discussed above with the single riser and grasper instrument stand. As illustrated, the instrument stands in the instrument stand system are identical. In one embodiment, the instrument stand system includes three instrument stands.

Each instrument stand containing the plurality of risers and plurality of graspers can be used independent of the other instruments stands or in combination with the other instrument stands. In one embodiment, one of more of the risers can also include the riser extensions as discussed herein.

Figure 9:
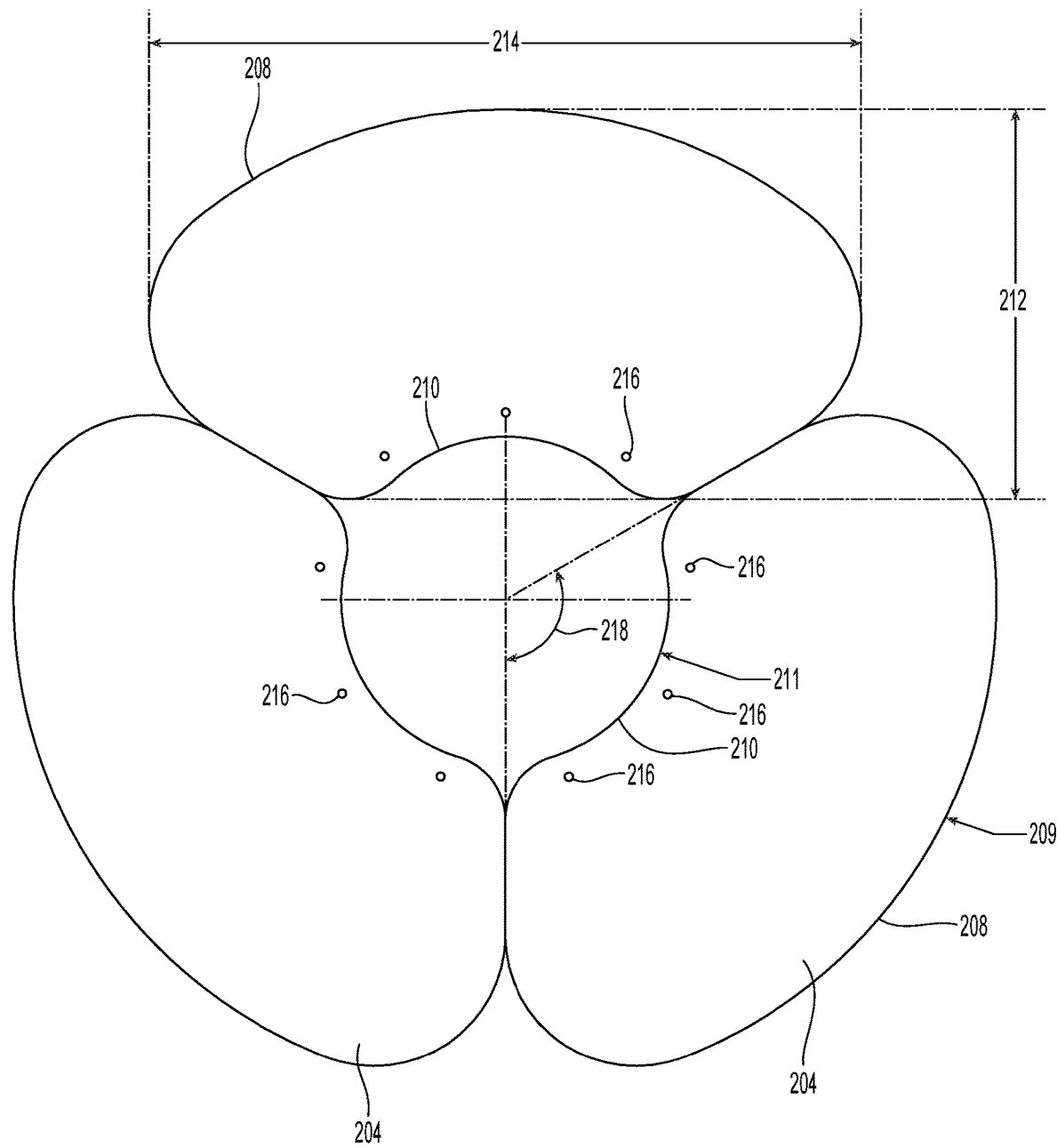
FIG. 9 is a top view of an embodiment of the bases used in the instrument stand system.

Referring now to FIG. 9, in one embodiment, each base of each instrument stand is sized and shaped to fit within a rectangular area having an overall depth 212 of less than about 12 inches, e.g., about 11.91 inches, and an overall width 214 of less than about 22 inches, e.g., about 21.75 inches. Therefore, each instrument stand, if used independent of the other instrument stands easily fits on a conventional shelf with a depth of 12 inches. As illustrated, each base is shaped as a partial circular sector with a central angle 218 of 120 degrees. Therefore, the bases of three instrument stands can be placed together to form a complete circle, i.e., 360 degrees.

In one embodiment, each partial circular sector includes an inner arc 210 or edge located at an inner radius 211. In one embodiment, the inner radius is about five inches. In addition, each partial circular sector includes an outer arc 208 or edge located at an outer radius. In one embodiment, the outer radius is about fifteen inches. Therefore, the outer radius is selected such that the bases of the three instrument stands define a circle having an overall diameter 209. In one embodiment, the overall diameter is about 30 inches. For each base of each instrument stand, the risers are attached to the base at a plurality of separate and distinct locations. Preferably, the risers are located at a plurality of distinct locations 216 along and adjacent to the inner arc of each base.

Figure 10:
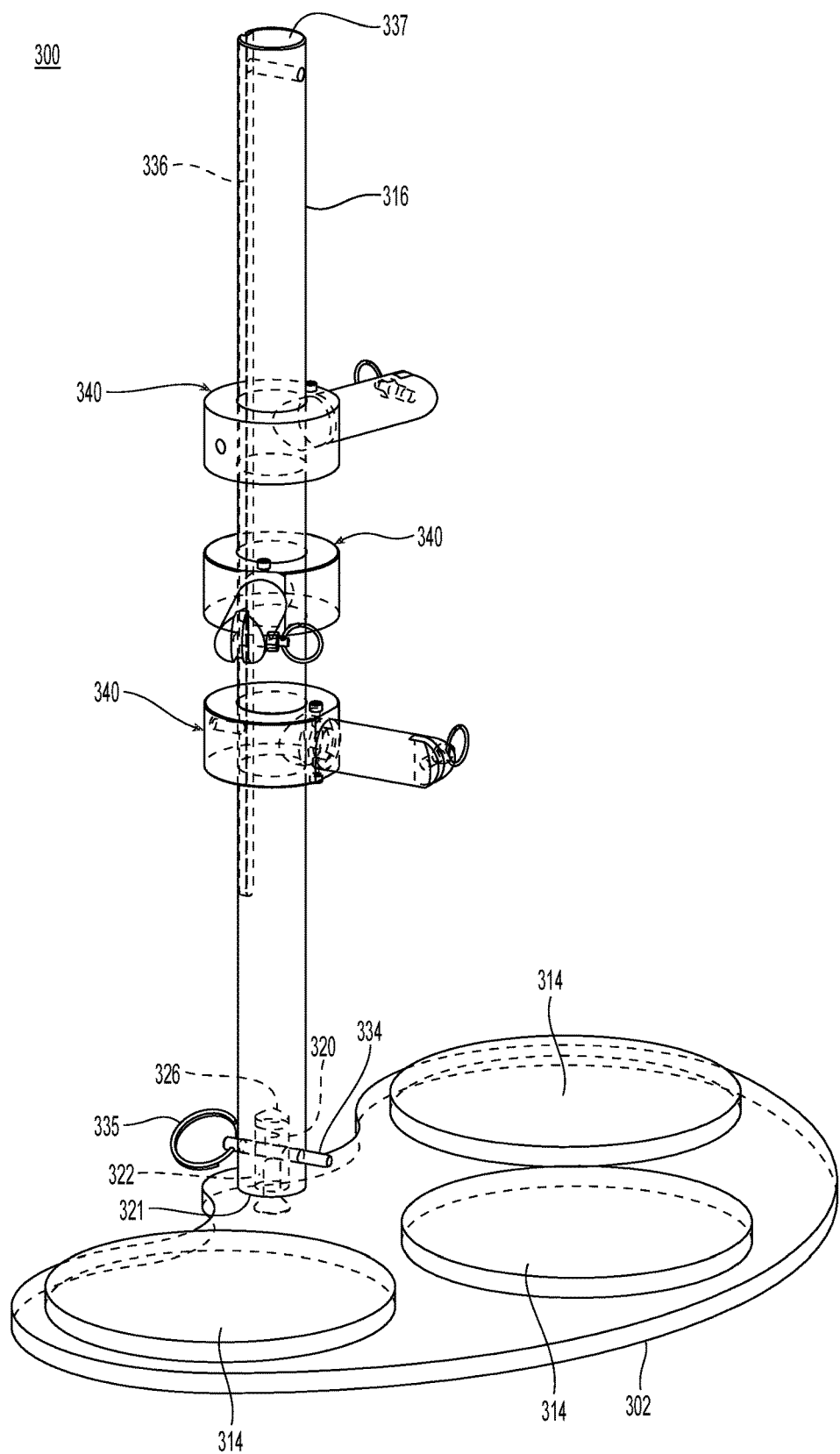
FIG. 10 is a perspective view of another embodiment of the instrument stand with a single riser holding multiple graspers.
Figure 11:
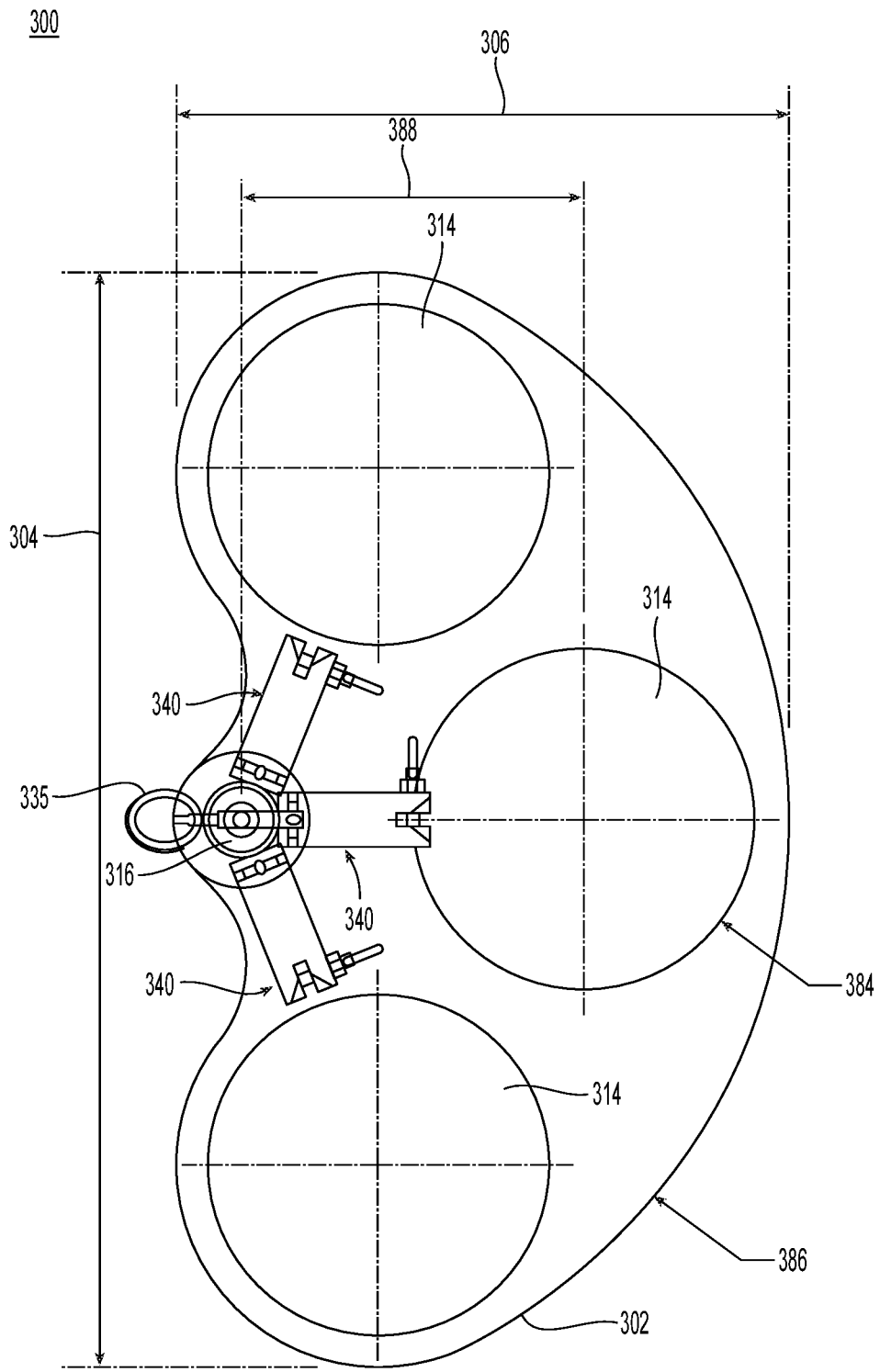
FIG. 11 is a top view of the embodiment of the instrument stand with the single riser holding multiple graspers.
Figure 12:
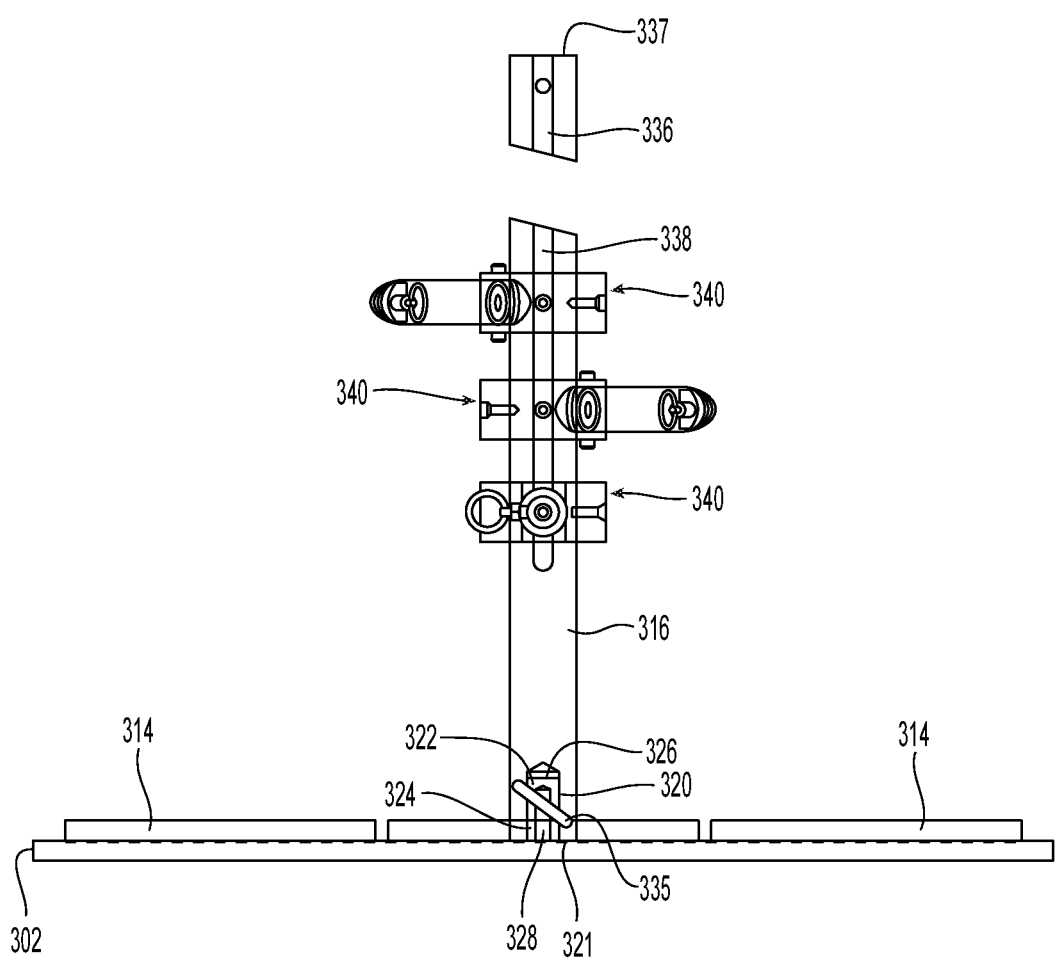
FIG. 12 is a side view of the embodiment of the instrument stand with the single riser holding multiple graspers.

Referring now to FIGS. 10-12, exemplary embodiments are directed to an instrument stand 300 having a plurality of separate and independent graspers mounted on a single riser. All of the materials for the instrument stand are the same as for the other embodiments of the instrument stand discussed herein. The musical instrument stand includes a base 302. As illustrated, the base fits within a rectangular area having an overall depth 306 of less than or equal to about 9 inches and an overall width 304 of less than about 17", e.g., about 16.39 inches. In one embodiment, the base has a rounded semi-circular shape having a diameter 386 of about 18 inches.

The instrument stand includes a single riser 316 attached to the top surface of the base and extending vertically upward from the base. The riser extends upward from the base a distance or height sufficient to accommodate the largest or tallest musical instrument to be held by the instrument stand. The riser contains a notch 336 extending into the riser from the outer surface of the riser and along a length of the riser from a top end 337 of the riser. In one embodiment, the notch extends into the riser from the outer surface a depth of about 0.22 inches. The length that the notch extends along the riser is less than the overall length or height of the riser. Therefore, the riser is spaced from the bottom end 321 of the riser. In one embodiment, the notch has a rectangular cross-section. In one embodiment, the interior face 338 of the notch is a flat surface. Alternatively, the interior face of the notch includes holes, bumps or other recesses.

The riser is attached to the base such that the riser can be easily detached from the base without tools and with minimum manipulation of movement of the riser such as rotating the riser to thread the riser into a hole. In one embodiment, the riser includes a central bore 320, for example, a cylindrical central bore, extending into the bottom end 321 of the riser that contacts the top surface of the base. In one embodiment, the cylindrical central bore has a diameter of about 0.5 inches. A locating pin 322 attached to the base and extending up from the top surface of the base. In one embodiment, the locating pin is cylindrical and is sized to accommodate the central bore of the riser, i.e., to achieve a snug fit between the locating pin and the central bore. Preferably, the location pin is a stainless steel dowel. The locating pin engages the central bore when the riser is attached to the base, and the central bore extends into the riser a distance sufficient to accommodate the locating pin. The locating pin includes a flat top surface 326 that passes into the central bore and a threaded passage 324 extending into the locating pin opposite the flat top surface. A threaded fastener 328 passes through the base and threads into the locating pin to secure the locating pin to the base. In one embodiment, the fastener is a flat head screw. The bottom or head of the screw that touches the base is flat or extra wide to create the effect of a washer. Other suitable shapes for the bottom or head of the fastener include button, pan, round, round washer and truss. The locating pin is secured to the base using the threaded fastener, becoming part of the base.

The instrument stand includes a detent pin 334 extending through a base attachment hole 332 that passes through the riser adjacent the end of the riser in contact with the base. The detent pin also passes a through hole in the locating pin that is aligned with the base attachment hole. Suitable detent pins are known and available in the art. A ring 335 or other suitable handle is attached to one end of the detent pin to facilitate insertion and removal of the detent pin. The ring also prevents the detent pin from passing completely through the base attachment hole and through hole. Therefore, the detent pin secures the riser to the base. Alignment between the base attachment hole and the through hole provides proper orientation between the riser and the base. The detent pin is easily inserted into and removed from the aligned holes. With the detent pin removed, the riser can be separated from the base, facilitating disassembly of the instrument stand.

The instrument stand includes a plurality of separate and independent graspers 340 attached to the riser. As illustrated, the instrument stand includes three graspers mounted to the single riser. Each grasper is configured to fasten a separate musical instrument to the instrument stand. Each grasper is located at a different height along the length of the riser. The grasper is moveable along the riser to change a distance between the grasper and the base or the base pad. The grasper can be secured to or can hold any suitable portion of the body or structure of the musical instrument as described herein. In one embodiment, the grasper is configured to grasp a neck strap ring on the musical instrument.

Figure 13:
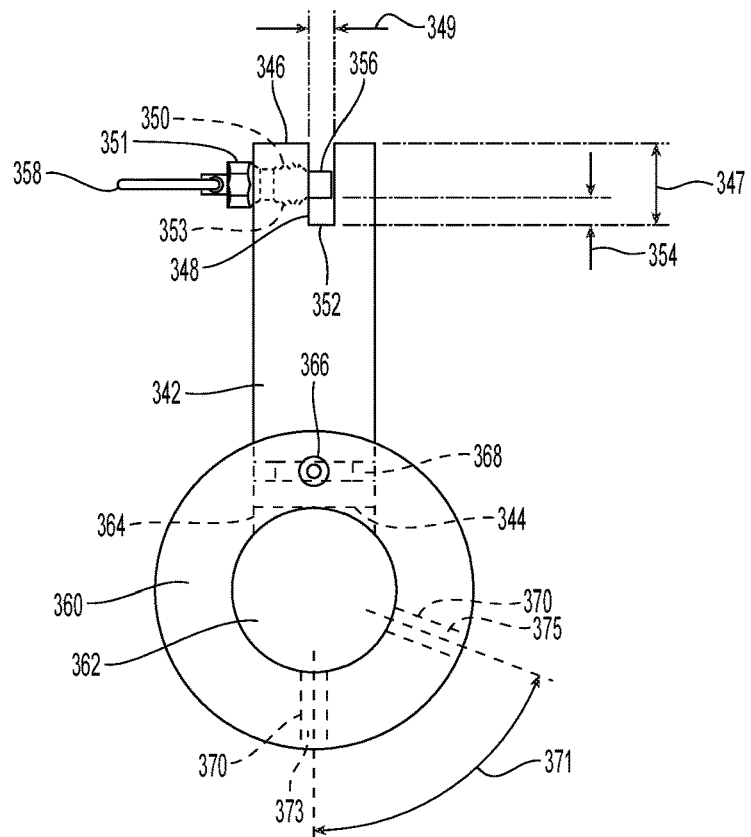
FIG. 13 is a top view of an embodiment of the grasper containing two threaded bores.
Figure 14:
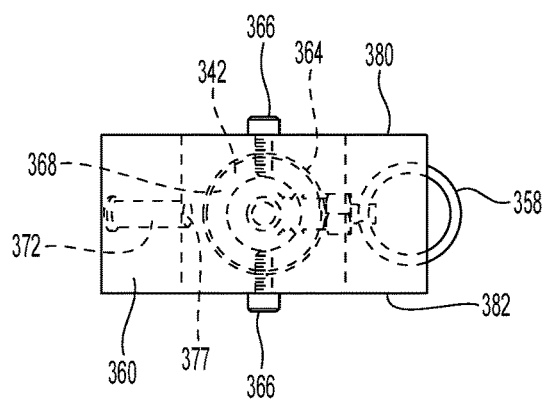
FIG. 14 is a side view opposite the arm of the embodiment of the grasper with two threaded bores.
Figure 15:
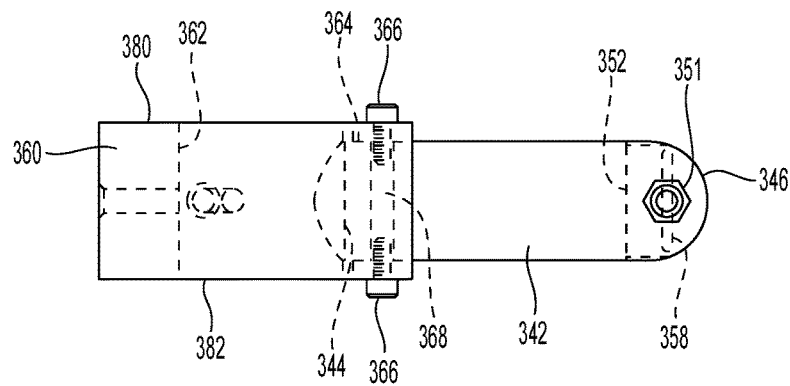
FIG. 15 is a side view along the arm of the embodiment of the grasper with two threaded bores.

Referring now to FIGS. 13-15, each grasper includes an arm 342 extending from the riser. As illustrated, each grasper is identical. Alternatively, each grasper can have a unique configuration. Each arm is attached to or mounted to the riser and is slidable along the length of the riser. The arm includes a proximal end 344 adjacent the riser, and a distal end 346 opposite the proximal end. The distal end can be radiused and the edges chamfered or beveled. The proximal end and distal end define a span length of the arm. The proximal end is flat and spaced from the outer surface of the riser. In one embodiment, the arm is a cylindrical member having a circular cross-section; however, other shapes and geometries can be used for the arm. A slot 348 in the arm extends in from the proximal end a slot distance 347. For an arm having a circular cross section, the slot extends across a diameter of the cross section of the arm. In one embodiment, the slot is oriented vertically, i.e., parallel to the length of the riser. In one embodiment, the arm is rotatable about an axis passing through the center of the arm and perpendicular to the length of the riser. Rotation of the arm about the axis positions the slot in a desired position from a horizontal orientation to a vertical orientation. The slot extends into the arm a slot depth. In addition, the slot has a gap width 349. The gap width is sufficient to allow passage into the slot of the portion of the musical instrument held by the grasper. For example, the gap width is sufficient to allow a neck strap ring to pass into the slot.

A hole 350 extends through a portion of the arm containing the slot. The hole is adjacent the proximal end. The hole extends completely through the arm. For an arm having a circular cross section, the hole extends along a diameter of the circular cross section. Preferably, the diameter along which the slot extends is perpendicular to the diameter along which the hole extends. In one embodiment, the hole only passes through one side of the arm adjacent the slot. Therefore, the hole does not pass completely through the arm. The hole is located a distance 354 from a bottom 352 of the slot. This distance is sufficient to allow the portion of the musical instrument held by the grasper, e.g., the next strap ring, to be entirely positioned between the hole and the slot bottom.

A pin 356 is disposed in the hole and has a length sufficient to span the gap width of the slot. The pin is moveable within the hole between a position in which the pin is spanning the slot and a position in which the pin does not extend into the slot. When the pin spans the slot, the slot is closed, and the portion of the musical instrument placed into the slot is secured to the arm and the musical stand. When the pin does not extend into the slot, the slot is open, and the portion of the musical instrument to be held by the musical instrument stand can be moved into and out of the slot. Preferably, the pin is biased into the position in which the pin is spanning the slot, i.e., in which the slot is closed. Therefore, the grasper will hold the portion of the musical instrument until the pin is moved to release that portion. In one embodiment, a biasing member 353, for example a spring, is disposed between the pin and the arm to bias the pin in the hole and across the gap width. Suitable arrangements of pins and biasing members include spring plungers. The pin and biasing members are attached to the arm and held in the hole using fasteners 351. In one embodiment, a ring 358 is attached to an end of the pin. The ring can be grabbed and pulled to move the pin in the direction of arrow A toward the position in which the pin does not extend into the slot.

Each grasper includes a slip ring 360. The slip ring connects the arm to the riser and provides relative movement between the arm and the riser. In one embodiment, the slip ring also provides for rotational movement of the arm relative to the slip ring and, therefore, orientation of the slot. In one embodiment, the slip ring is cylindrical with a circular cross section and a cylindrical central passage 362. The cylindrical riser extends through the cylindrical central passage of the slip ring. The slip ring includes a circular passage 364 extending radially through the slip ring and into the central passage. The arm extends through the circular passage and radially out from the slip ring. A pair of set screws 366 run axially along the slip ring and into the top and bottom of the circular passage. These set screws engage an annular groove 368 extending around the arm adjacent the distal end. Engagement of the set screws in the annular groove secure the arm to the slip ring. The arrangement of the annular groove and set screws also facilitates rotation of the arm within the circular passage. In one embodiment the set screws provide for the securing and rotation of the arm. In one embodiment, each set screw bottoms but still allows the arm able to rotate. The use of two opposing screws provides added security. Therefore, if one set screw loosens or falls out, the remaining set screw continues to secure the arm.

Each grasper includes a pair of threaded bores 370 passing radially through the slip ring opposite the circular passage and the arm. The pair of threaded bores are spaced from each other around the circumference of the slip ring by a positioning angle 371. In one embodiment, the positioning angle is about 69 degrees. The pair of threaded bores include a first threaded bore 373 radially aligned with the circular passage and the arm, and a second threaded bore 375 spaced from the first threaded bore by the positioning angle.

A threaded fastener 372 is threaded into just one of the pair of threaded bores in each slip ring, extending through the threaded bore to engage the notch as discussed above. Engagement of the threaded fastener in the notch establishes an orientation of the slip ring and arm around the riser. Contact and friction between the threaded fastener and the interior face of the notch holds the slip ring and arm at a desired location along the length of the riser and above the base and base pad. In one embodiment, movement of the threaded fastener releases the fastener from the interior face and provides for upward or downward movement of the slip ring and arm. Preferably, the threaded fastener is a spring plunger having a threaded outer housing that engages the threaded bore to prevent relative movement between the outer housing and the threaded bore. The spring plunger includes a spring loaded ball 377 in contact with the interior face of the notch and asserting from about 2 pounds to about 5 pounds of force on the interior face. This force is sufficient to hold the grasper at a given position along the length of the riser. Applying force to either the top of bottom of the slip ring provides adjustment of the location of the grasper along the height of the riser without having to move or to disengage the spring plunger from the interior face of the notch.

The riser includes a single notch; therefore, selection of the threaded bore into which the threaded fastener is inserted determines the orientation of the of the arm around the riser. For a threaded fastener placed in the first threaded bore, the arm will extend from the riser opposite the notch. For a threaded fastener placed in the second threaded bore, the arm will extend from the riser at a position rotated around the riser by the positioning angle. Placing the slip ring over the riser with either a first side 380 or a second side 382 on top, determines whether the arm will be rotated around the riser in a clockwise direction or counter clockwise direction.

For an instrument stand having a single riser, three graspers and two threaded bores, only one threaded fastener is placed in the first threaded bore. For the other two graspers, the threaded fastener is placed in the second threaded bore. One grasper is placed on the first with the first side on top, and the other grasper is placed on the riser with the second side on top. Returning to FIGS. 10-12, this yields the arrangement of graspers and orientation of arms as illustrated. Attached to the top surface of the base are a plurality of base pads 314. As illustrated, the instrument stand includes three base pads, one for each grasper. Each based pad is oriented to align with one of the graspers. As illustrated, each base pad is a circle having a diameter 384 of about 5 inches. The center of each circle is spaced a distance 388 of about 5 inches from the center of the riser. Each base pad is attached to and covers at least a portion of the top surface of the base. Suitable materials for each base pad include foam rubber and textiles such as vinyl. Preferably, the base pad is polyurethane foam. In general, the base pad provides a cushion surface to support the musical instrument.

While illustrated with three graspers and three base pads, the instrument stand can include more that three graspers. For embodiments having more than three graspers, the slip ring includes additional threaded bores spaced around the slip ring by additional positioning angles. This provides for orientation of the arms at separate locations around the riser.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An instrument stand comprising:
   a base;
   a riser releasably attached to the base and comprising a length extending upward from the base; and
   a grasper moveably attached to the riser to lock a musical instrument to the instrument stand, the grasper slidable along the length of the riser to change a distance between the grasper and the base, the grasper slideable along the length of the riser with the musical instrument locked to the instrument stand.

2. The instrument stand of claim 1, wherein the grasper is configured to grasp a neck strap ring on the musical instrument to lock the musical instrument to the instrument stand.

3. The instrument stand of claim 1, wherein the grasper comprises:
   an arm extending from the riser, the arm comprising:
      a proximal end adjacent the riser;
      a distal end opposite the proximal end;
      a slot extending in from the proximal end, the slot comprising a gap width; and
      a hole extending through a portion of the arm containing the slot;
   a pin moveably disposed in the hole and spanning the gap width of the slot; and
   a biasing member disposed between the pin and the arm to bias the pin in the hole and across the gap width.

4. The instrument stand of claim 3, wherein:
   the riser is cylindrical; and
   the grasper further comprises a slip ring, the cylindrical riser extending through the slip ring and the arm extending radially out from the slip ring.

5. The instrument stand of claim 4, wherein:
   the riser comprises a notch extending into the riser along a length of the riser; and
   the grasper further comprises:
      a threaded bore passing radially through the slip ring opposite the arm; and
      a threaded fastener extending through the threaded bore and engaging the notch.

6. The instrument stand of claim 1, wherein:
   the riser comprises a central bore; and
   the base includes a locating pin extending from the base, the locating pin engaging the central bore when the riser is attached to the base.

7. The instrument stand of claim 6, wherein the instrument stand further comprises a detent pin extending through the riser and the locating pin to secure the riser to the base.

8. The instrument stand of claim 1, wherein the instrument stand further comprises:
   a plurality of risers, each riser attached to a distinct location on the base; and
   a plurality of graspers, each grasper attached to one of the risers.

9. The instrument stand of claim 8, wherein the instrument stand comprises three risers and three graspers.

10. The instrument stand of claim 8, wherein the base fits within a rectangular area comprises an overall depth of less than about 12 inches and an overall width of less than about 22 inches.

11. The instrument stand of claim 8, wherein the base comprises a partial circular sector with a central angle of 120 degrees.

12. The instrument stand of claim 11, wherein the partial circular sector comprises:
   an inner arc at a radius of five inches; and
   an outer arc at a radius of fifteen inches.

13. The instrument stand of claim 12, wherein the risers are located at a plurality of distinct locations along and adjacent the inner arc.

14. An instrument stand comprising:
   a base;
   a single riser releasably attached to the base, the riser extending upward from the base and comprising a notch extending into the riser along a length of the riser; and
   a plurality of separate and distinct graspers, each grasper attached to the riser, moveable along the riser to change a distance between the grasper and the base and configured to grasp a neck strap ring on a musical instrument to fasten the musical instrument to the instrument stand, wherein each grasper comprises:
      a slip ring, the riser extending through the slip ring;
      a pair of threaded bores passing radially through the slip ring, the pair of threaded bores spaced from each other around the slip ring a positioning angle; and
      a single threaded fastener extending through one threaded bore in the pair of threaded bores and engaging the notch.

15. An instrument stand system comprising a plurality of separate instrument stands, each instrument stand comprising:
   a base comprising only a partial circular sector;
   a plurality of risers releasably attached to the base, each riser comprising a length extending upward from the base; and
   a plurality of graspers, each grasper moveably attached to one of the plurality of risers to fasten a musical instrument to the instrument stand, the grasper slidable along the length of the riser to change a distance between the grasper and the base.

16. The instrument stand system of claim 15, wherein:
   the instrument stand system comprises three instrument stands; and
   the partial circular section of each base comprises a central angle of 120 degrees, an inner arc at a radius of five inches and an outer arc at a radius of fifteen inches, the bases of the three instrument stands fitting together to form a circle having a diameter of 30 inches.

17. The instrument stand system of claim 16, wherein each instrument stand comprises three risers releasably attached to the base at a plurality of distinct locations along and adjacent the inner arc.

18. The instrument stand system of claim 15, wherein each grasper is configured to grasp a neck strap ring on a musical instrument to fasten the musical instrument to the instrument stand.

19. The instrument stand system of claim 15, wherein:
each riser is cylindrical; and
each grasper comprises:
   a slip ring, one of the cylindrical risers extending through the slip ring;
   an arm extending radially out from the slip ring, the arm comprising:
      a proximal end adjacent the riser;
      a distal end opposite the proximal end;
      a slot extending in from the proximal end, the slot comprising a gap width; and
      a hole extending through a portion of the arm containing the slot;
   a pin moveably disposed in the hole and spanning the gap width of the slot; and
   a biasing member disposed between the pin and the arm to bias the pin in the hole and across the gap width.

20. The instrument stand system of claim 19, herein:
each riser comprises a notch extending into the riser along a length of the riser; and
each grasper further comprises:
   a threaded bore passing radially through the slip ring opposite the arm; and
   a threaded fastener extending through the threaded bore and engaging the notch.

* * * * *